(12) United States Patent
Nogami et al.

(10) Patent No.: US 8,537,015 B2
(45) Date of Patent: Sep. 17, 2013

(54) TAG COMMUNICATION DEVICE, TAG COMMUNICATION SYSTEM, AND TAG COMMUNICATION METHOD

(75) Inventors: Hidekatsu Nogami, Kyoto (JP); Hirokazu Kasai, Kyoto (JP)

(73) Assignee: Omron Corporation, Kyoto (JP)

( * ) Notice: Subject to any disclaimer, the term of this patent is extended or adjusted under 35 U.S.C. 154(b) by 449 days.

(21) Appl. No.: 12/743,765

(22) PCT Filed: Dec. 24, 2008

(86) PCT No.: PCT/JP2008/073434
§ 371 (c)(1),
(2), (4) Date: Jun. 24, 2010

(87) PCT Pub. No.: WO2009/087896
PCT Pub. Date: Jul. 16, 2009

(65) Prior Publication Data
US 2010/0271210 A1    Oct. 28, 2010

(30) Foreign Application Priority Data

Jan. 8, 2008  (JP) ................................. 2008-001541

(51) Int. Cl.
*G08B 13/14*  (2006.01)
(52) U.S. Cl.
USPC .................................... 340/572.1; 340/10.51

(58) Field of Classification Search
USPC .................. 340/10.1, 10.51, 572.1, 572.4
See application file for complete search history.

(56) References Cited

U.S. PATENT DOCUMENTS

| | | | |
|---|---|---|---|
| 6,097,301 A * | 8/2000 | Tuttle | 340/10.1 |
| 7,567,179 B2 * | 7/2009 | Stephensen et al. | 340/10.51 |
| 2007/0080787 A1 | 4/2007 | Taki et al. | |
| 2007/0120650 A1 | 5/2007 | Nagai et al. | |
| 2008/0278291 A1 * | 11/2008 | Kuramoto et al. | 340/10.3 |

FOREIGN PATENT DOCUMENTS

| | | | |
|---|---|---|---|
| CN | 1716696 A | 1/2006 | |
| CN | 1853358 A | 10/2006 | |
| JP | 5-281346 A | 10/1993 | |
| JP | 2005-328252 A | 11/2005 | |
| JP | 2006-10345 A | 1/2006 | |
| JP | 2007-219927 A | 8/2007 | |
| WO | WO 2005/125032 A1 | 12/2005 | |

* cited by examiner

*Primary Examiner* — Thomas Mullen
(74) *Attorney, Agent, or Firm* — Dickstein Shapiro LLP

(57) ABSTRACT

It is possible to provide a tag communication device, a tag communication system, and a tag communication method which can secure an optimal communication region even when an antenna installation environment or a peripheral environment changes. A tag A is arranged in a preset communication region while a tag B is arranged outside the communication region. A reader/writer (3) repeatedly scans a radio beam M emitted from a scan antenna (4) and then controls the radio beam so that all the tags A can be read while no tag B can be read according to the ID which has been read.

18 Claims, 9 Drawing Sheets

(a)

(b)

(a)

(b)

(a)

(b)

TAG COMMUNICATION DEVICE, TAG COMMUNICATION SYSTEM, AND TAG COMMUNICATION METHOD

TECHNICAL FIELD

The present invention relates to tag communication devices and tag communication systems that wirelessly communicate with an RFID tag, and in particular to a tag communication device, a tag communication system, and a tag communication method that can secure an optimal communication region.

BACKGROUND ART

A tag communication device that wirelessly communicates with an RFID tag given to an object such as a package by a radio beam emitted from an antenna is conventionally known. For instance, a tag communication device described in patent document 1 is known as one of such tag communication devices. Such a tag communication device includes an antenna with a plurality of antenna elements, and is configured to wirelessly communicate with the RFID tag attached to the package by repeatedly scanning the radio beam emitted from the antenna.

Such a tag communication device can enlarge the communication region and can suppress occurrence of collision of the communication, thereby enhancing the reliability of the communication. On the other hand, the direction of the radio beam may change thereby changing the communication region when an antenna installation environment or a peripheral environment changes, or the antenna physically moves. It is difficult to secure an optimal communication region in the above cases since this tag communication device does not have a function for correcting the communication region.
Patent document 1: Japanese Unexamined Patent Publication No. 2006-10345

DISCLOSURE OF THE INVENTION

Problem to be Solved by the Invention

The present invention has been devised to solve the problem described above, and an object thereof is to provide a tag communication device, a tag communication system, and a tag communication method which can secure an optimal communication region even when an antenna installation environment or a peripheral environment changes.

Means for Solving the Problem

In order to achieve the above object, the present invention provides a tag communication device that wirelessly communicates with an RFID tag by emitting a radio beam from an antenna, the tag communication device including: a receiving means for receiving identification information respectively from a first RFID tag arranged in a communication desired region as a spatial region in which communication is desired, and a second RFID tag arranged outside the communication desired region and at a position adjacent to the communication desired region; and a control means for controlling the radio beam so as to be communicable with the first RFID tag and non-communicable with the second RFID tag according to the identification information received by the receiving means.

Further, the present invention provides a tag communication system that wirelessly communicates with an RFID tag by emitting a radio beam from an antenna, the tag communication device including: a tag communication device including a receiving means for receiving identification information respectively from a first RFID tag arranged in a communication desired region as a spatial region in which communication is desired, and a second RFID tag arranged outside the communication desired region and at a position adjacent to the communication desired region; and a control device including a control means for controlling the radio beam so as to be communicable with the first RFID tag and non-communicable with the second RFID tag according to the identification information received by the receiving means.

Moreover, the present invention provides a tag communication method of wirelessly communicating with an RFID tag by emitting a radio beam from an antenna, the tag communication method including the steps of: receiving identification information respectively from a first RFID tag arranged in a communication desired region as a spatial region in which communication is desired, and a second RFID tag arranged outside the communication desired region and at a position adjacent to the communication desired region; and controlling the radio beam so as to be communicable with the first RFID tag and non-communicable with the second RFID tag according to the received identification information.

The "tag communication device" includes a reader/writer and a reader capable of wirelessly communicating with an RFID tag.

The RFID tags include a passive type RFID tag, which does not have a power supply such as a battery, wherein the circuit operates by the power transmitted in radio wave from the reader/writer, and which wirelessly communicates with the reader/writer, and an active type RFID tag, which has a power supply such as a battery.

The "communication desired region" refers to a region arbitrarily set by a user in advance as a region for wirelessly communicating between an RFID tag and a tag communication device. For instance, consider an environment in which a stockyard is arranged between an assembly station where electronic components are mounted on a substrate and a test station where a resultant assembly is tested (see FIG. 1 to be described later). Assume that in such an environment a tag communication device not intending to communicate with an RFID tag of a returnable box placed in the assembly station or the test station but intending to communicate with an RFID tag of a returnable box placed in the stockyard when the RFID tags are given to the returnable boxes to manage products. In this case, the communication region set by the user in advance so as to be non-communicable with the RFID tag of the returnable box placed in the assembly station or the test station and to be communicable with the RFID tag of the returnable box placed in the stockyard becomes the "communication desired region".

The "first RFID tag" and the "second RFID tag" having the same structure as the RFID tag that wirelessly communicates with the tag communication device are applicable, but at least the "first RFID tag" and the "second RFID tag" need to be identifiable on the tag communication device side. Here, that arranged in advance in the communication desired region is referred to as the "first RFID tag" and that arranged outside the communication desired region is referred to as the "second RFID tag" for the sake of convenience. At least one of each of the "first RFID tag" and the "second RFID tag" are required, but may be in plurals.

Thus, when the radio beam is emitted from the antenna, a state in which the reception is made from the "first RFID tag" and the reception is not made from the "second RFID tag" becomes the communication desired region set by the user, that is, the optimal communication region to the tag communication device. The tag communication device of the present invention is configured such that the radio beam is controlled by the control means so that the communication region is the optimal state.

The method thereof includes, for example, controlling the radio beam by shifting the directivity direction of the radio beam, or controlling the radio beam by adjusting the strength of the transmission power of the radio beam.

The RFID tag is given to an object, and the object is a movable body that moves on a movement path, where the first RFID tag and the second RFID tag may be arranged along the movement path. The object obviously refers to articles such as a package, but also refers to humans and animals as long as the RFID tag can be given. Here, "give" mainly means attach, but other methods such as binding a tag or the like may be adopted as long as the RFID tag and the object can be associated. Furthermore, the movable body that moves on the movement path includes a package conveyed by a conveyance means such as a conveyor.

The above antenna may be a scan antenna for scanning the radio beam.

The control means may be configured to control the timing of reading by the scan antenna. The scan antenna is a phased array antenna capable of high-speed scanning the radio beam to transmit by electronic control, and is configured by a plurality of antenna elements, a plurality of phasers respectively connected to the plurality of antenna elements, and one distribution synthesizer connected to all of the plurality of phasers. The radio wave input to the distribution synthesizer is distributed to the phaser of each antenna element, subjected to the desired phase change in each phaser, and radiated from each antenna element, where the radio wave is radiated strongly in the direction each radio wave of after the phase change are all the same phase, that is, the direction in which the phase of the sinusoidal wave coincides. The strongest radio wave is the "radio wave" of the "antenna" in the present invention such as the main lobe, and the direction of the main lobe can be arbitrarily changed by the setting of the phaser.

The plurality of antenna elements may be configured by a patch antenna, or the plurality of antenna elements may be two-dimensionally arrayed to enable two-dimensional scanning. It is suitable if the plurality of antennas is configured by the patch antenna since the scan antenna can be manufactured thin, and the manufacturing cost can be suppressed low. If the plurality of antennas is arrayed in a two-dimensional array, for example, if the plurality of antenna elements is arrayed in a circular shape or a matrix shape on the same plane, the scanning can be carried out as if drawing a circle.

The "identification information" read from the "first RFID tag" and the "second RFID tag" includes an ID (Identification) containing a tag NO. for identifying the RFID Tag. The ID needs to be set so that at least the "first RFID tag" and the "second RFID tag" can be identified.

Effect of the Invention

As described above, according to the present invention, the first RFID tag is arranged in the communication desired region and the second RFID tag is arranged adjacent to the communication desired region and outside the communication desired region. The identification information is read from the respective RFID tag by emitting the radio beam from the antenna, and the radio beam is controlled so as to be communicable with the first RFID tag and non-communicable with the second RFID tag according to the read identification information. The optimal communication region thus can be secured even when the antenna installation environment or the peripheral environment changes.

BEST MODE FOR CARRYING OUT THE INVENTION

The best mode for carrying out the invention will be described below in detail with reference to the accompanied drawings. The following description is made with a reader/writer applied for the tag communication device, and a scan antenna applied for the antenna, but this is not thesole case. In the embodiments described below, that in which a communication system is configured using the reader/writer having the characteristics portions of the present invention is referred to as "RFID communication system", and that in which a communication system is configured using the commercially available reader/writer that does not have the characteristic portions of the present invention is referred to as "tag communication system of the present invention". Furthermore, in the embodiments described below, the RFID tag is given to an object such as a package, but the present invention is also applicable even to a mode in which the tag is not given to the object if a position tag or a sensor tag is used.

First Embodiment

Figure 1:
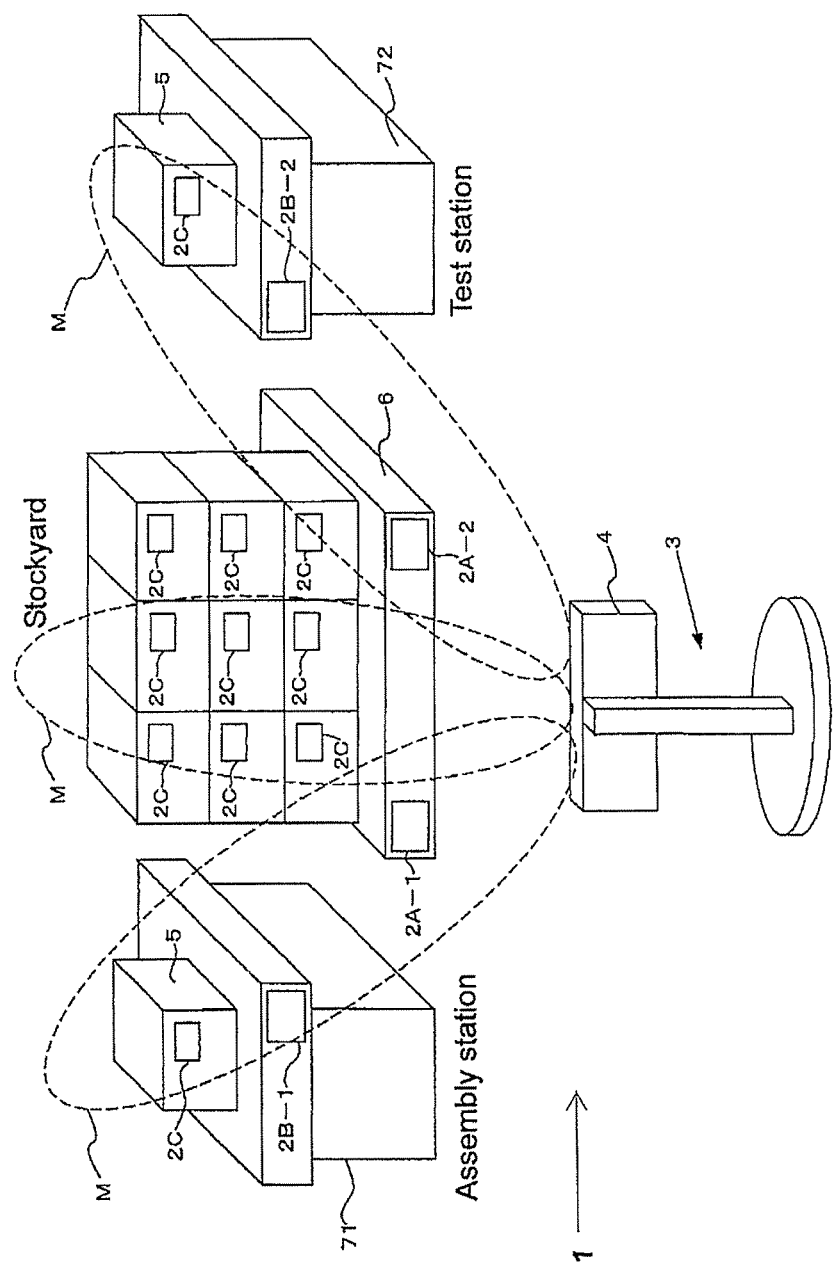
FIG. 1 is a schematic view of an RFID communication system according to a first embodiment applied with a tag communication device of the present invention.
Figure 2:
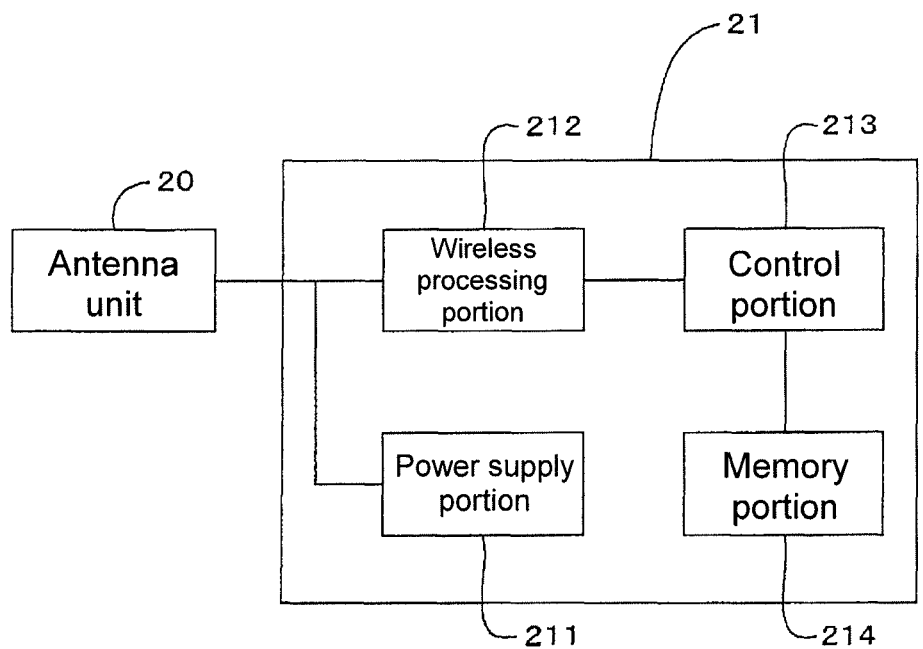
FIG. 2 is a block diagram showing a schematic configuration of an RFID tag.
Figure 3:
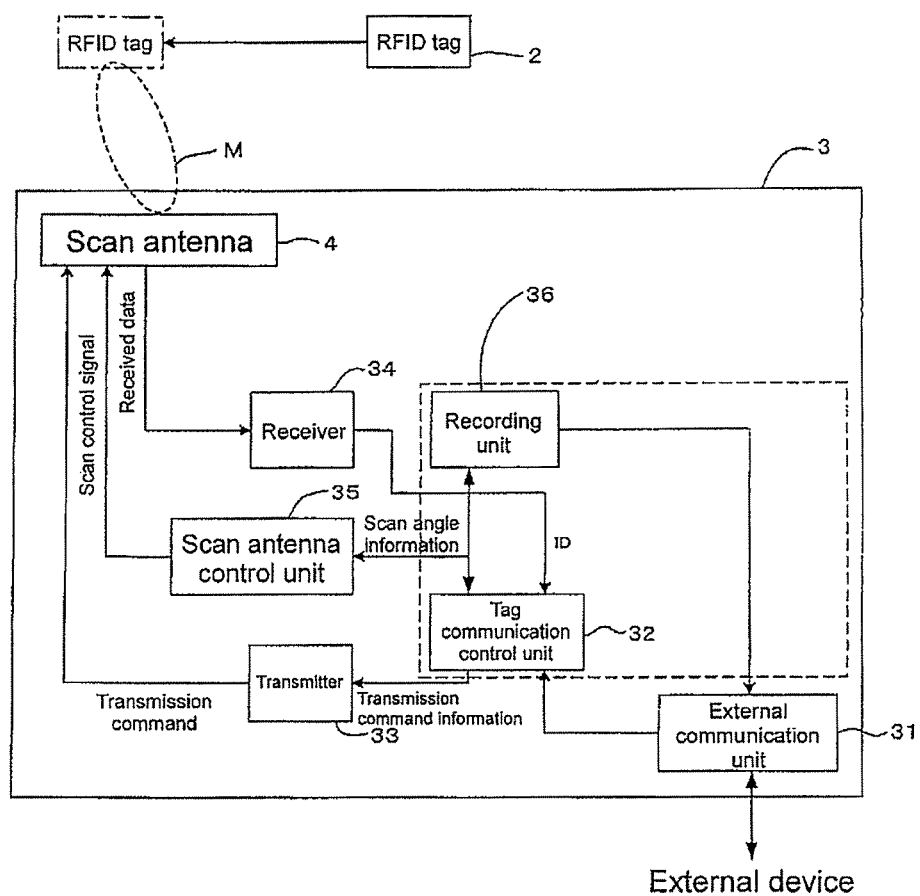
FIG. 3 is a block diagram showing a schematic configuration of a reader/writer (tag communication device).
Figure 4:
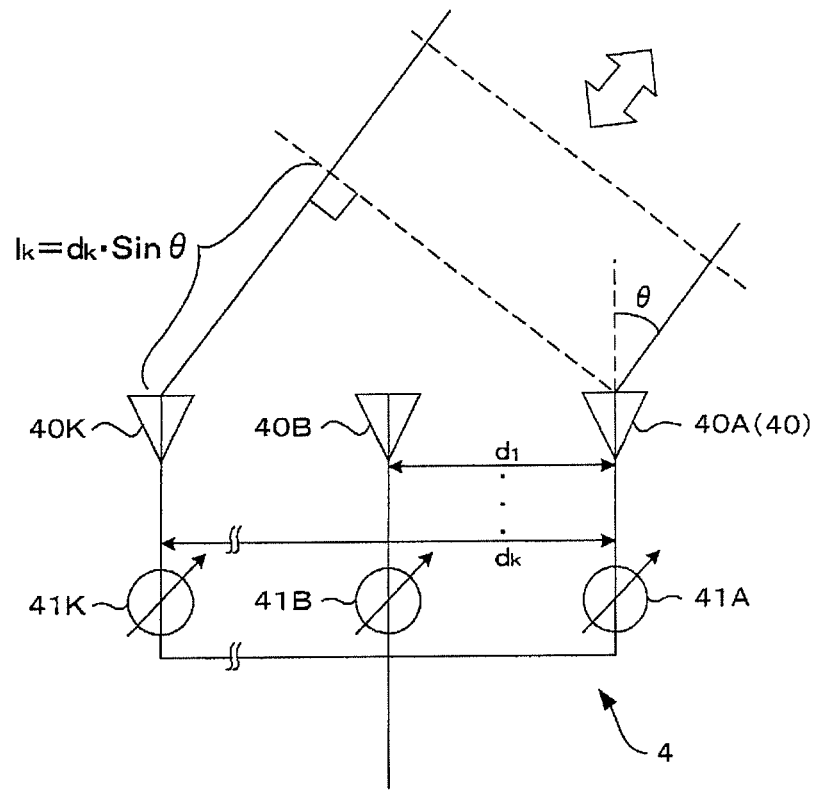
FIG. 4 is a schematic view showing an outline of a scan antenna.
Figure 5:
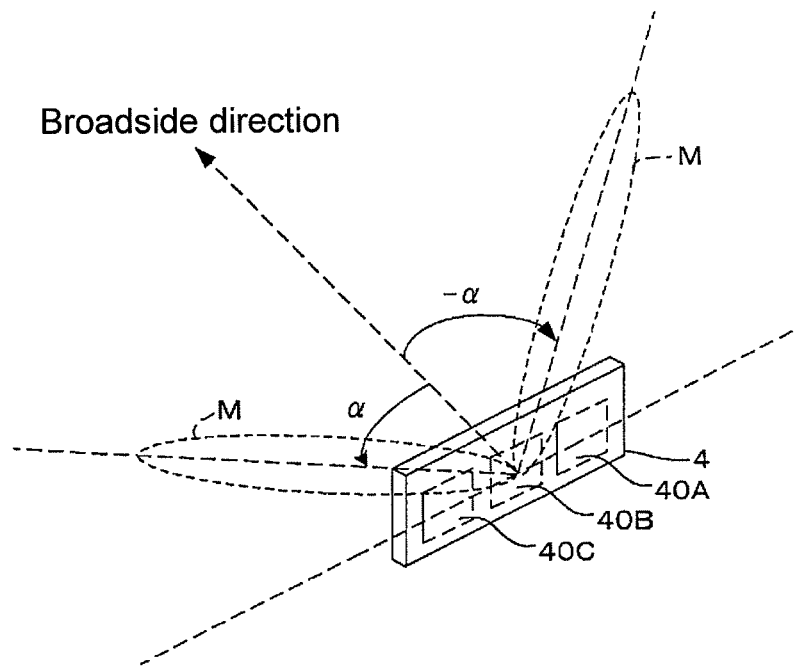
FIG. 5 is a schematic view showing a scanning state of the scan antenna.
Figure 6:
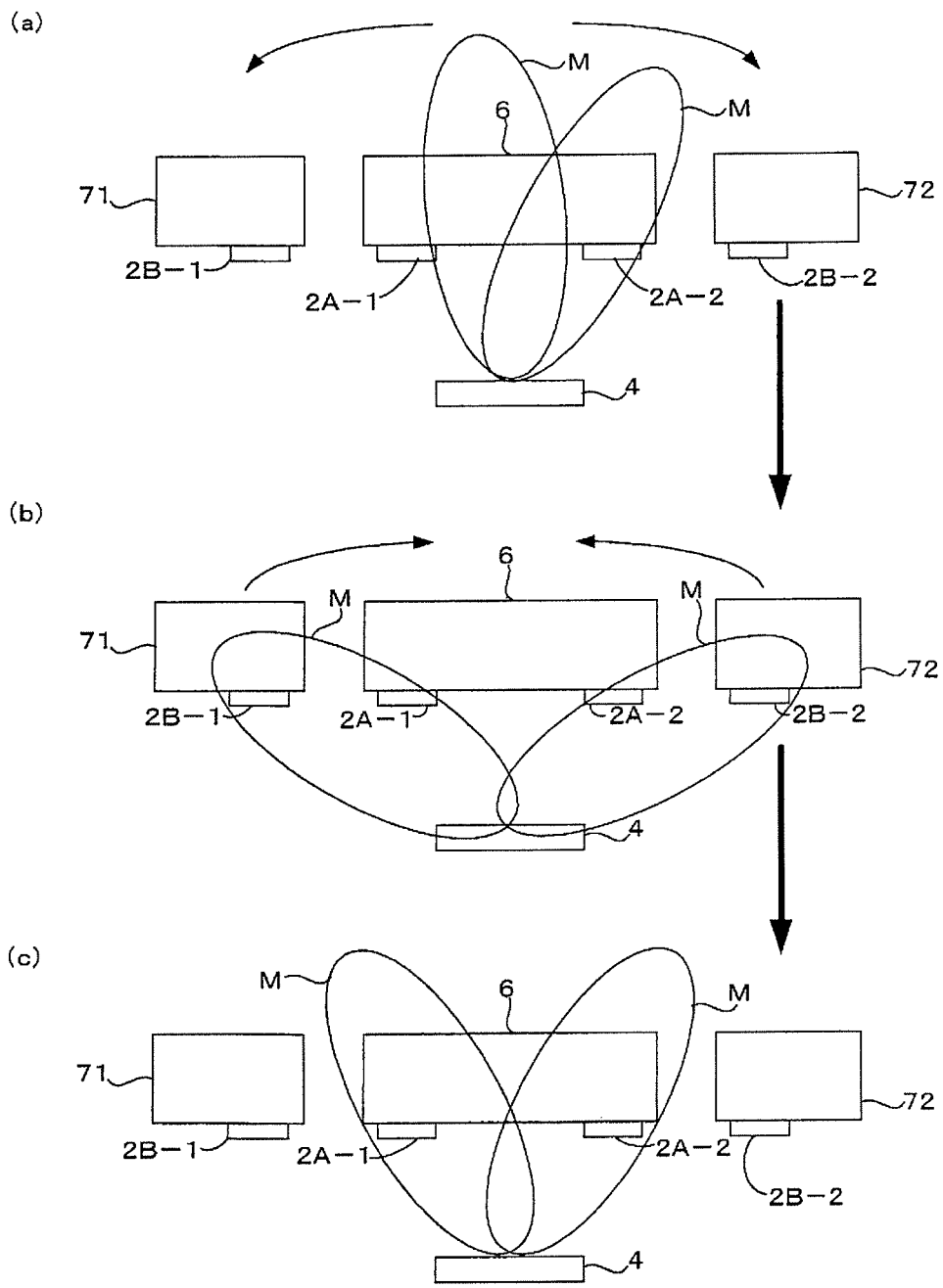
FIGS. 6(a) to 6(c) are schematic views showing procedures for optimizing a communication region by the scan antenna.
Figure 7:
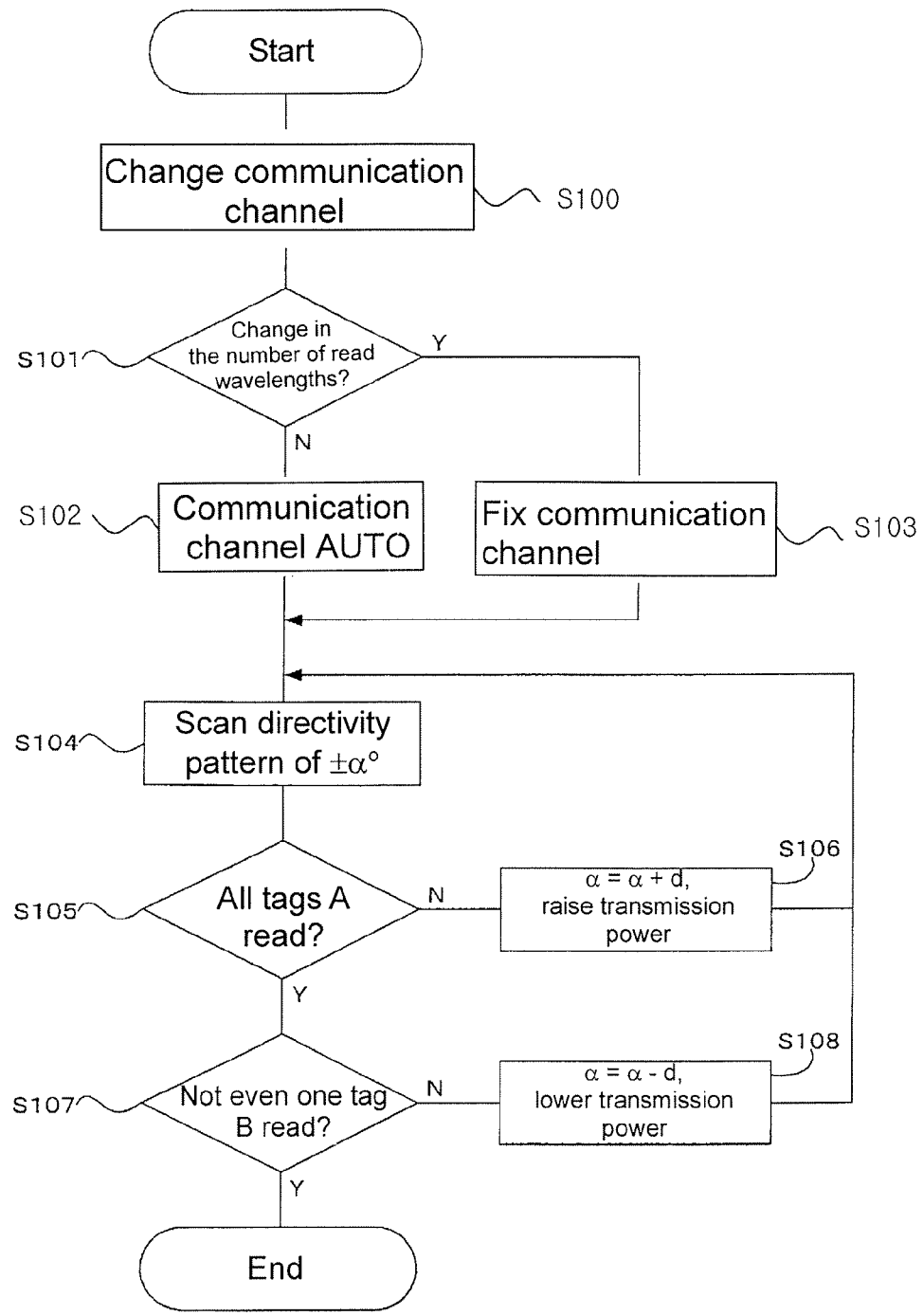
FIG. 7 is a flowchart showing the procedures for optimizing the communication region by the scan antenna.

FIG. 1 is a schematic view of an RFID communication system according to a first embodiment applied with the tag communication device of the present invention, FIG. 2 is a block diagram showing a schematic configuration of an RFID tag, FIG. 3 is a block diagram showing a schematic configuration of a reader/writer (tag communication device), FIG. 4 is a schematic view showing an outline of a scan antenna, FIG. 5 is a schematic view showing a scanning state of the scan antenna, FIG. 6 includes schematic views showing the procedures for optimizing the communication region by the scan antenna, and FIG. 7 is a flowchart showing the procedures for optimizing the communication region by the scan antenna.

As shown in FIG. 1, the RFID communication system 1 according to the present embodiment is a system used in an environment where a stockyard is arranged between an assembly station and a test station. Specifically, first in the assembly station, electronic components are mounted on a substrate (this state is hereinafter called as "print substrate"), which is thereafter accommodated in a returnable box 5. The print substrate accommodated in the returnable box 5 is then conveyed to the test station to be subjected to predetermined tests, and thereafter accommodated in the stockyard. In this case, an RFID tag 2C respectively attached to the returnable box 5 and the reader/writer 3 wirelessly communicate on what kind of returnable box 5 is accommodated in the stockyard to carry out stock management.

A specific configuration of the RFID communication system 1 will be described with reference to FIG. 1. The RFID communication system 1 includes an RFID tag 2B-1 (second RFID tag) attached to a work table 71 of the assembly station, an RFID tag 2B-2 (second RFID tag) attached to a work table 72 of the test station, RFID tags 2A-1, 2A-2 (first RFID tag) attached to a pallet 6 mounted with a plurality of returnable boxes 5 and the reader/writer 3 (tag communication device) including a scan antenna 4 arranged facing the RFID tags. In FIG. 1, a state in which the radio beam M emitted from the scan antenna 4 is being repeatedly scanned is shown.

The RFID tag 2B-1 and the RFID tag 2B-2 are attached to the work tables 71, 72, respectively, where the attachment positions thereof are suitably on the side close to the stockyard and on the surface facing the scan antenna 4. An optimal communication region (communication desired region) in the present embodiment is such a communication region where the radio beam M emitted from the scan antenna 4 can wirelessly communicate with the RFID tags 2C . . . attached to the returnable boxes 5 mounted on the pallet 6, and cannot wirelessly communicate with the RFID tags 2C attached to the returnable boxes 5, 5 mounted on the work tables 71, 72. Therefore, the RFID tag 2B-1 and the RFID tag 2B-2 are also preferably attached on the side close to the stockyard in order to prevent wireless communication with the RFID tags 2C attached to the returnable boxes 5, 5 mounted on the work tables 71, 72, respectively.

The configuration of the RFID tag and the reader/writer will be described in detail below. As described above, the RFID tag attached to the returnable box 5, the RFID tags attached to the work tables 71, 72, and the RFID tag attached to the pallet 6 may all have the same structure, and thus will be comprehensively described below as the RFID tag 2 when used without distinction.

As shown in FIG. 2, the RFID tag 2 is configured to include an antenna unit 20 and a wireless communication IC 21, and includes a passive type and an active type.

The antenna unit 20 receives the radio wave from the reader/writer 3 as a power source for operating the wireless communication IC 21. The antenna unit 20 converts the radio wave received from the reader/writer 3 to a wireless signal and transmits the same to the wireless communication IC 21, and also converts the wireless signal from the wireless communication IC 21 to the radio wave and transmits the same to the reader/writer 3. Antenna, resonance circuit, and the like are used for the antenna unit 20.

The wireless communication IC 21 stores the data from the reader/writer 3 based on the signal received from the reader/writer 3 through the antenna unit 20, and transmits the stored data to the reader/writer 3 through the antenna unit 20. As shown in FIG. 2, the wireless communication IC 21 is configured to include a power supply portion 211, a wireless processing portion 212, a control portion 213, and a memory portion 214.

The power supply portion 211 rectifies an induced voltage generated when the antenna unit 20 receives the radio wave, adjusts the same to a predetermined voltage with a power supply circuit, and then supplies the same to each portion of the wireless communication IC 21. A bridge diode, a voltage adjustment capacitor, and the like are used for the power supply portion 211.

The wireless processing portion 212 performs a process of converting a wireless signal received through the antenna unit 20 to an original format, a process of transmitting the converted data to the control portion 213, a process of converting the data received from the control portion 213 to a format suited for wireless transmission, and a process of transmitting the converted wireless signal to the outside through the antenna unit 20. An ND (Analog to digital) conversion circuit, a D/A (Digital to Analog) conversion circuit, a modulation/demodulation circuit, an RF circuit, and the like are used for the wireless processing portion 212.

The control portion 213 comprehensively controls the operations of various types of configurations as described above, in the wireless communication IC 21. The control portion 213 includes a logic arithmetic circuit, a register, and the like, and functions as a computer. The operation control of various types of configurations is carried out by causing a computer to execute the control program. The program may be installed in a ROM (Read Only Memory) or the like of the memory portion 214 and used by being read, or may be downloaded from the reader/writer 3 through the antenna unit 20 and the wireless processing portion 212, and installed in the memory portion 214 so as to be executed.

In particular, the control portion 213 performs a process of storing the data from the reader/writer 3 in the memory portion 214 based on the data received from the reader/writer 3 through the antenna unit 20 and the wireless processing portion 212, and a process of reading out the data stored in the memory portion 214 and transmitting to the reader/writer 3 through the wireless processing portion 212 and the antenna unit 20.

The memory portion 214 is configured by a semiconductor memory such as a ROM, an SRAM (Static RAM), and a FeRAM (ferroelectric memory). The content stored in the memory portion 214 includes the control program, various other types of programs, and various types of data such as IDs (identification information). The wireless communication IC 21 uses the radio wave transmitted from the reader/writer 3 as the power source, and thus is desirably a nonvolatile memory such as a ROM, or a memory of small power consumption such as an SRAM or an FeRAM. In the present embodiment, an ID is set in advance so that the RFID tag 2C attached to the returnable box 5, the RFID tags 2B-1, 2B-2 attached to the work tables 71, 72, respectively, and the RFID tags 2A-1, 2A-2 attached to the pallet 6 can be identified.

The configuration of the reader/writer 3 will be described below with reference to FIGS. 3 to 5.

As shown in FIG. 3, the reader/writer 3 includes an external communication unit 31, a tag communication control unit (control means) 32, a transmitter 33, a receiver (receiving means) 34, a scan antenna control unit 35, and a recording unit 36, and is configured to wirelessly communicate with the RFID tag 2 through the scan antenna 4.

The external communication unit 31 transmits the ID (Identification) and the like of the RFID tag 2 read by the reader/writer 3 to an external device (not shown). The external communication unit 31 is configured to receive the write information (transmission command information) and the command from the external device with respect to the RFID tag 2.

The tag communication control unit 32 receives the transmission command information transmitted from the external device (not shown) through the external communication unit 31, and transmits the same to the transmitter 33. The tag communication control unit 32 stores a scan pattern table (not shown), and is configured to perform scanning based on such a scan pattern table.

The scan pattern table includes data in which the power and the phase of each antenna element 40A, 40B, 40C of the scan antenna 4 are defined, where the scan pattern of the scan antenna 4 is generated by electrically setting the power and the phase defined for each antenna element 40A, 40B, 40C.

In other words, the scan angle of the scan antenna 4 is set by the scan pattern table. As shown in FIG. 5, the scan angle is an inclination angle of the radio beam measured with the broadside direction (direction perpendicular to the array direction of the antenna elements 40A, 40B, ... 40K) as a reference. For instance, when a phased array antenna in which a plurality of antenna elements is linearly arrayed is used for the scan antenna, the scan angle is an inclination angle of the beam measured with the broadside direction as a reference. In the present embodiment, the scan angle in the rightward direction in the figure is −a, and the scan angle in the leftward direction is +a.

The tag communication control unit 32 reads out the scan angle from the scan table, and transmits the read scan angle to the scan antenna control unit 35. Since the scan angles a and −a are set as the scan angle in the scan pattern table, the tag communication control unit 32 sequentially and repeatedly transmits the scan angles a and −a to the scan antenna control unit 35. The tag communication control unit 32 reads the ID from the RFID tag 2 through the scan antenna 4. The scan angles a, −a are not limited to two, and may be arbitrarily set by the user.

The transmitter 33 converts the transmission command information transmitted from the tag communication control unit 32 to a format suited for wireless communication, and transmits the converted wireless signal (transmission command) to the outside through the scan antenna 4, and performs processes such as modulation and amplification of the transmission command information.

The receiver 34 converts the wireless signal (received data) received through the scan antenna 4 to an original format, and transmits the converted data to the tag communication control unit 32, and performs processes such as amplification and demodulation of the received data.

The scan antenna control unit 35 receives the scan angle information from the tag communication control unit 32, transmits the scan control signal to the scan antenna 4 based on the received scan angle information, and controls the direction of the radio beam M radiated from the scan antenna 4. The scan angles a and −a are set in the scan pattern table. Thus, in the scan antenna control unit 35, a process of converting the scan angles a and −a to the scan control signal for having the radio beam M radiated from the scan antenna 4 sequentially to be directed in the direction of the scan angle a and the scan angle −a, and transmitting to the scan antenna 4 is performed.

The recording unit 36 records the ID read from the RFID tag 2 and transmits the same to the external device (not shown) through the external communication unit 31, or stores in advance a program for optimizing the communication region to be described later.

The scan antenna 4 has a configuration in which a plurality of antenna elements is linearly arrayed, and a variable phaser is connected to each antenna element. The antenna elements are not limited to being linearly arrayed, and may be arranged in a two-dimensional array. If the number of antenna elements is increased, the width of the radio beam M to output becomes narrower. Furthermore, a scanning method of the radio beam M in the scan antenna will be described below with reference to FIG. 4.

When all antenna elements 40A, 40B, ..., 40K transmit the radio wave at the same phase, the radio wave emitted from the scan antenna 4 is propagated as a plane wave in a direction perpendicular to the array direction of the antenna elements 40A, 40B, ... 40K. The phase of the radio wave transmitted by each antenna element 40A, 40B, ..., 40K is shifted so as to satisfy the following equation to incline the propagating direction of the radio wave by an angle 9 (rad) measured from the broadside direction.

As shown in FIG. 4, assuming the wavelength of the radio wave to transmit or receive is X(m), the distance between the antenna element 40A that becomes a reference and the k-th antenna element 40K as dk (m), and the distance between the equal phase surface passing the antenna element 40A which is the equal phase surfaces shown with a broken line in FIG. 4 and the k-th antenna element 40K as lk (m), the shift yk of the phase of the k-th antenna element 40K with respect to the phase of the antenna element 40A that becomes a reference can be expressed with the following equation.

$$=(lk/A)\times 2-rr=(dk\times \sin e/A)\times 2n.$$

Therefore, the scan antenna 4 can direct the radio beam M in the target direction by shifting the phase of the signal so that each variable phaser 41A, 41B, 41K satisfies the above equation. When receiving the radio wave, the direction of the received radio wave can be determined by detecting the shift of the phase of each antenna element 40A, 40B, ..., 40K.

The optimization process of the communication region by the reader/writer 3 will be described with reference to FIGS. 6 and 7. In the following description, the RFID tag attached to the pallet 6 is collectively referred to as tag A, and the RFID tags attached to the work tables 71, 72 are collectively referred to as tag B.

First, the reader/writer 3 is activated, and the wireless communication is carried out to check the status of the directive radio wave. Specifically, as shown in FIG. 7, the wireless communication is attempted with the RFID tag 2 by changing the communication channel (S100), and by checking whether or not the number of read radiowaves changes (S101). When the number of read radiowaves is changed as a result (Y of S101), the communication channel is fixed (S103), and when the number of read radiowaves is not changed (N of S101), the communication channel is set to AUTO (S101), and scanning is started with the directivity pattern of ±a (S104). Such a scanning process is performed under the control of the tag communication control unit 32, as described above. FIG. 6(a) schematically shows such a first scanning process.

When the scanning process is performed, the ID received by the receiver 34 from the RFID tag 2 through the scan antenna 4 is transmitted to the tag communication control unit 32, and the content of the ID is checked. Specifically, whether or not the IDs of the tag A are all contained, that is, whether or not two IDs of the RFID tags 2A-1 and 2A-2 in the present embodiment are contained in the relevant ID is checked (S105). If determined that all the tags A are read as a result (Y of S105), whether or not even one ID of the tag B is contained, that is, not even one ID of the RFID tag 2B-1 and 2B-2 in the present embodiment is contained in the ID is checked (S107). If determined as not contained as a result (Y of S107), the optimization process of the communication region is terminated.

If determined that not all the tags A are read in S105, the following processes are performed. In other words, if determined that not all the tags A are read by the tag communication control unit 32, the scan angle is increased or the transmission power is raised (S106), and thereafter, the scanning process (S104) is again performed, and whether or not the tags A are all read is again checked. This process is repeatedly carried out until all the tags A are ultimately read.

If determined that all the tags A are read through the above processes, whether not even one tag B is read is checked (S107), where if determined that at least one tag B is read as a result (N of S107), the tag communication control unit 32 reduces the scan angle or lowers the transmission power (S108), and again performs the scanning process (S104). Whether or not all the tags A are read is again checked, and then, whether the tag B is not read is checked. This process is carried out until the processes of S105 and S107 are both "Y", and the optimization process of the communication region is terminated after both processes become "Y". The optimization process of the communication region may be carried out at the time of installing the reader/writer 3, or may be programmed in advance so as to be carried out periodically.

According to the above configuration, when the antenna installation environment or the peripheral environment changes, the optimal communication region can be secured even if a person hits the antenna thereby slightly shifting the emitting direction of the radio beam M.

In the above description, the scan pattern table has been described as being mounted on the scan antenna control unit 35, but is not limited thereto, and may be mounted on the scan antenna 4. The scan antenna control unit 35 and the recording unit 36, that is, the characteristic portions of the present invention have been described as being mounted on the reader/writer 3, but are not limited thereto, and may be configured to be mounted on the external control device side (not shown) connected to the reader/writer 3. In this case, the reader/writer itself may not be special, and a commercially available reader/writer may be used as is. The effects similar to the above, that is, the implementation of a system capable of securing the optimal communication region even if the antenna installation environment or the peripheral environment changes by using the commercially available reader/writer is realized by the tag communication system of the present invention. In the following embodiments as well, the characteristic portions of the present invention can be mounted on the external control device connected to the reader/writer.

Second Embodiment

Figure 8:
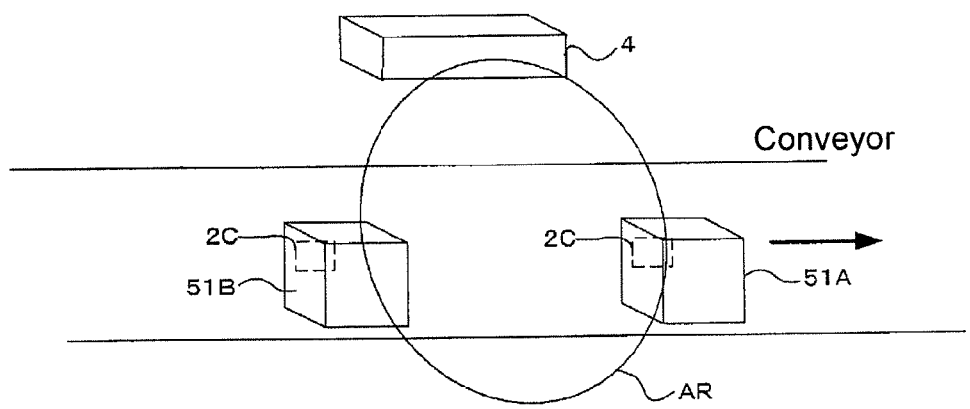
FIG. 8 includes schematic views for describing an RFID communication system according to a second embodiment applied with the tag communication device of the present invention, where (a) shows a case in which the present invention is not applied and (b) shows a case in which the present invention is applied.
Figure 8:
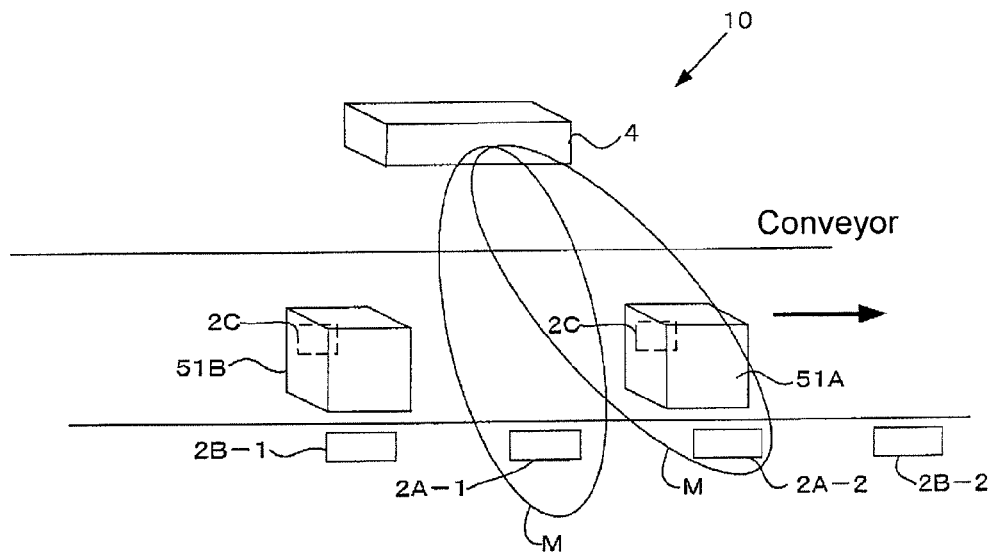

A second embodiment of the present invention will be described with reference to FIG. 8. FIG. 8 includes schematic views of an RFID communication system according to the second embodiment applied with the tag communication device (reader/writer) of the present invention.

The difference with the first embodiment lies in that the target to attach the RFID tag 2C is the stationary returnable box 5 in the first embodiment but is the cargos 51A, 51B, . . . that moves on the conveyor in the second embodiment. When reading is carried out with the cargos 51A, 51B, . . . moving on the conveyor, the RFID tag 2C outside the limited range may not be desirably read. For instance, if the reading range (communication region) AR is set as shown in FIG. 8(a), not only the cargo 51A to be read but also the adjacent cargo 51B is sometimes read when carrying out the control of the conveyor. In this case, false distribution may occur such as the cargo 51A may be carried into the path movement of the cargo 51B.

Such false distribution is prevented by the RFID communication system 10 according to the second embodiment. Specifically, the RFID tags 2A-1 and 2A-2 are set in advance and arranged in the communication region, and the RFID tags 2B-1 and 2B-2 are arranged at both sides, that is, outside the communication region. Such RFID tags 2A-1, 2A-2, 2B-1, 2B-2 are linearly arranged along the conveyor. Such arrangement is appropriately determined by comprehensively taking into consideration the conveyance speed of the conveyor, the distance between the cargos 51A, 51B, the scan speed of the scan antenna 4, and the like.

The structure of each RFID tag 2, the structure of the reader/writer 3, the optimization process of the communication region, and the like are similar to the first embodiment, and thus the description will be omitted herein.

Third Embodiment

Figure 9:
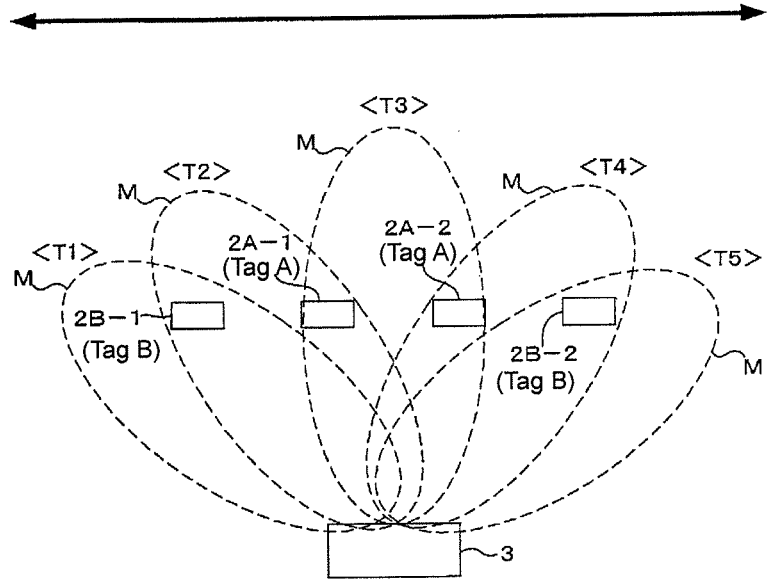
FIG. 9 includes schematic views of an RFID communication system according to a third embodiment applied with the tag communication device of the present invention, where (a) shows a direction of a radio beam M and (b) shows scanning timings.
Figure 9:
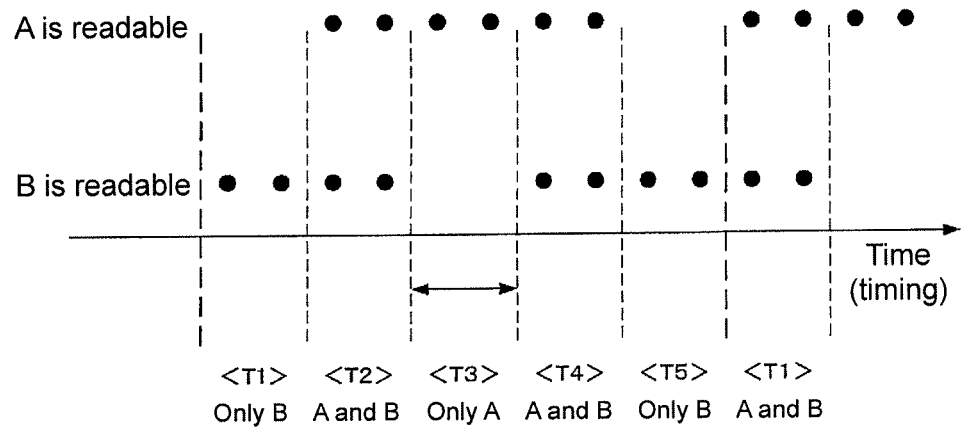

A third embodiment of the present invention will be described with reference to FIGS. 9 and 10. FIG. 9 includes schematic views of an RFID communication system according to the third embodiment applied with the tag communication device of the present invention, where (a) shows a direction of the radio beam M, and (b) shows scanning timings. FIGS. 10(a) and 10(b) are flowcharts showing procedures for realizing optimization of the communication region by the scan antenna.

The RFID communication system according to the third embodiment is configured to realize the optimization of the communication region by repeatedly scanning the radio beam M and recording the timing of reading each RFID tag 2A-1, 2A-2, 2B-1, 2B-2.

Figure 10:
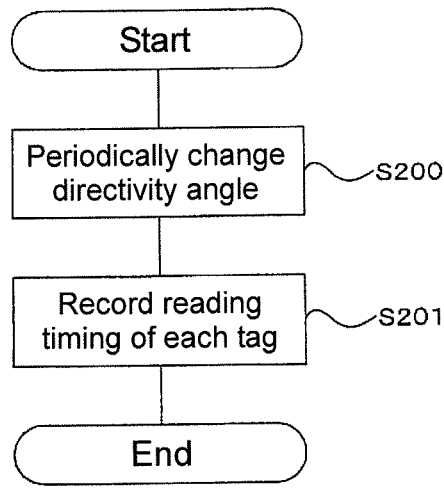
FIGS. 10(a) and (b) are flowcharts showing a procedure for realizing optimization of a communication region by a scan antenna.
Figure 10:
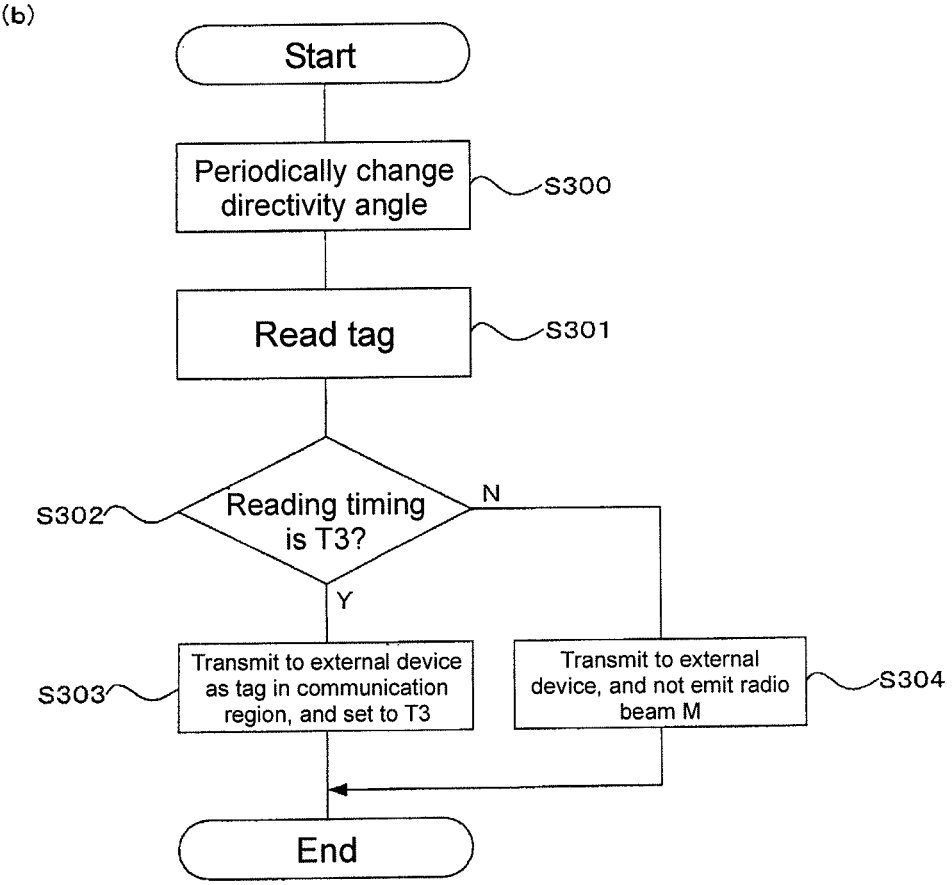

Describing in detail with reference to FIGS. 9 and 10, the radio beam M is scanned as shown in FIG. 9(a), where there are five scan angles in this case and such scan angles are set in advance. The radio beam M is repeatedly scanned based on the scan angles, and the IDs read from the RFID tag (tag A or tag B) at the respective timings T1, T2, T3, T4, and T5 are recorded. The reading timing, as shown in FIG. 9(b), then can be extracted. Specifically, the ID can be read only from the tag B at the reading timings T1, T5, the ID can be read from both the tag A and the tag B at the timings T2, T4, and the ID can be read from only the tag A at the timing T3. Therefore, the communication region can be optimized if the timing T3 can be extracted.

The optimization process of the communication region will be described in further detail with reference to FIG. 10. First, the reader/writer 3 is activated to perform the process shown in FIG. 10(a) and record each reading timing. Specifically, the directivity angle of the radio beam M emitted from the scan antenna 4 of the reader/writer 3 is periodically changed and scanned as in (a) of the figure (S200), and the reading timing of each RFID tag is recorded (S201). In the present embodiment, the reading timings T1 to T5 are recorded, and the ID read at each timing is recorded in association therewith.

After the above-described process is terminated, the scan antenna 4 is scanned (S300), the reading process of each RFID tag is carried out (S301), and whether or not the reading timing is T3 is checked (S302). If it is the reading timing T3 as a result (Y of S302), the RFID tags 2A-1, 2A-2 (tag A) having the associated ID are transmitted to the external device as the RFID tags in the communication region, and the timing to emit the radio beam M is set to T3 (S303). If it is not the reading timing T3 (N of S302), the data is transmitted to the external device assuming the ID is received from the RFID tags 2B-1, 2B-2 (tag B) outside the communication region, and the radio beam M is controlled so as not to be emitted at each timing (S304).

According to such a configuration, the communication region can be optimized and the reading timing can be also controlled.

The invention claimed is:

1. A tag communication device that wirelessly communicates with an RFID tag by emitting a radio beam from an antenna, the tag communication device comprising:
   a receiving means for receiving identification information respectively from a first RFID tag arranged in a communication desired region as a spatial region in which communication is desired, and a second RFID tag arranged outside the communication desired region and at a position adjacent to the communication desired region; and
   a control means for controlling the radio beam so as to be communicable with the first RFID tag and non-communicable with the second RFID tag according to the identification information received by the receiving means.

2. The tag communication device according to claim 1, wherein the control means controls the radio beam by adjusting a direction of the radio beam.

3. The tag communication device according to claim 1 or 2, wherein the control means controls the radio beam by adjusting a strength of a transmission power of the radio beam.

4. The tag communication device according to claim 1, wherein
   the RFID tag is given to an object; and
   the object is a movable body that moves on a movement path, the first RFID tag and the second RFID tag being arranged along the movement path.

5. The tag communication device according to claim 1, wherein the antenna is a scan antenna for scanning the radio beam.

6. The tag communication device according to claim 5, wherein the control means controls a timing of reading by the scan antenna.

7. A tag communication system that wirelessly communicates with an RFID tag by emitting a radio beam from an antenna, the tag communication system comprising:
   a tag communication device including a receiving means for receiving identification information respectively from a first RFID tag arranged in a communication desired region as a spatial region in which communication is desired, and a second RFID tag arranged outside the communication desired region and at a position adjacent to the communication desired region; and
   a control device including a control means for controlling the radio beam so as to be communicable with the first RFID tag and non-communicable with the second RFID tag according to the identification information received by the receiving means.

8. The tag communication system according to claim 7, wherein the control means controls the radio beam by adjusting a direction of the radio beam.

9. The tag communication system according to claim 7 or 8, wherein the control means controls the radio beam by adjusting a strength of a transmission power of the radio beam.

10. The tag communication system according to claim 7, wherein
    the RFID tag is given to an object; and
    the object is a movable body that moves on a movement path, the first RFID tag and the second RFID tag being arranged along the movement path.

11. The tag communication system according to claim 7, wherein the antenna is a scan antenna for scanning the radio beam.

12. The tag communication system according to claim 11, wherein the control means controls a timing of reading by the scan antenna.

13. A tag communication method of wirelessly communicating with an RFID tag by emitting a radio beam from an antenna, the tag communication method comprising the steps of:
    receiving identification information respectively from a first RFID tag arranged in a communication desired region as a spatial region in which communication is desired, and a second RFID tag arranged outside the communication desired region and at a position adjacent to the communication desired region; and
    controlling the radio beam so as to be communicable with the first RFID tag and non-communicable with the second RFID tag according to the received identification information.

14. The tag communication method according to claim 13, wherein the controlling is carried out by adjusting a direction of the radio beam.

15. The tag communication method according to claim 13 or 14, wherein the controlling is carried out by adjusting a strength of a transmission power of the radio beam.

16. The tag communication method according to claim 13, wherein
    the RFID tag is given to an object; and
    the object is a movable body that moves on a movement path, the first RFID tag and the second RFID tag being arranged along the movement path.

17. The tag communication method according to claim 13, wherein the antenna is a scan antenna for scanning the radio beam.

18. The tag communication method according to claim 17, wherein the controlling is carried out by controlling a timing of reading by the scan antenna.

* * * * *